Nov. 21, 1933.  E. R. DRAVER  1,936,292
ENGINE STARTING MECHANISM
Filed Dec. 11, 1930
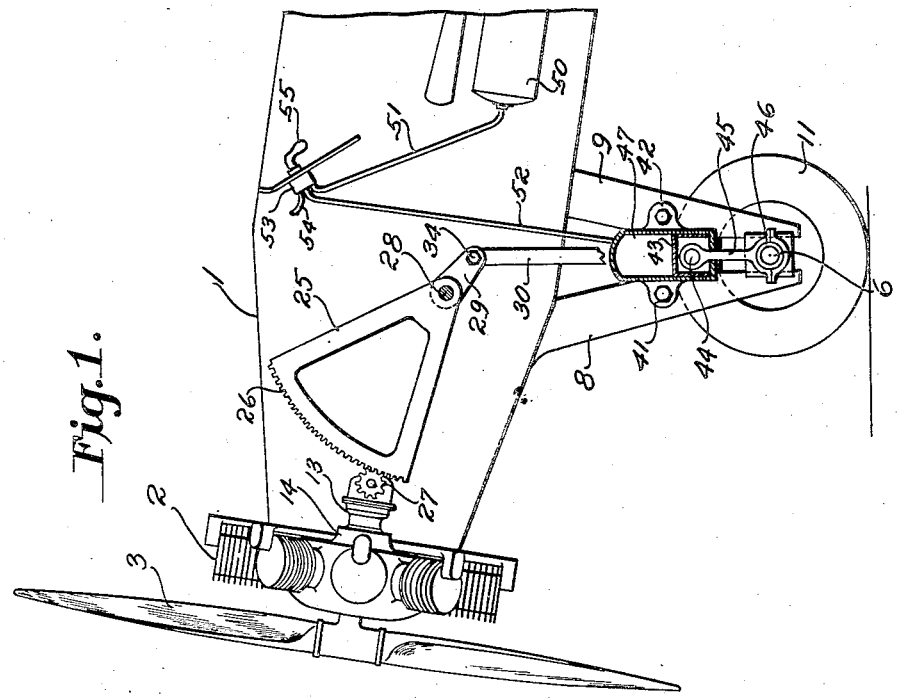
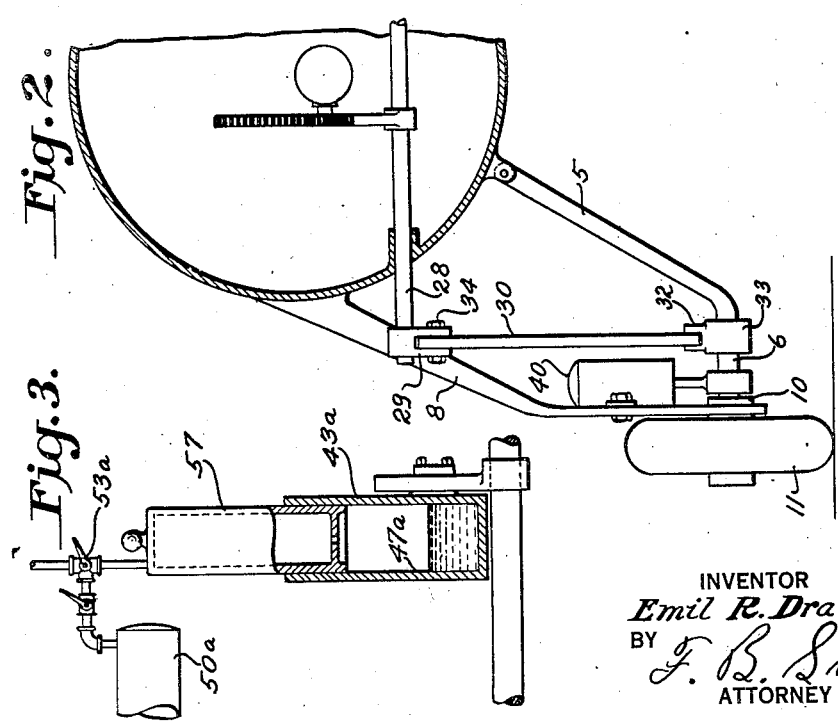
INVENTOR
*Emil R. Draver.*
BY *F. B. Smith.*
ATTORNEY Patented Nov. 21, 1933

1,936,292

UNITED STATES PATENT OFFICE 1,936,292

ENGINE STARTING MECHANISM

Emil R. Draver, Richmond, Ind., assignor to Eclipse Aviation Corporation, East Orange, N. J., a corporation of New Jersey Application December 11, 1930
Serial No. 501,689

12 Claims. (Cl. 244—31)

This invention relates to engine starting apparatus, and also to a combined engine starter and shock absorbing system for automotive vehicles.

In the illustrations herewith, the invention is shown applied to a conventional type of airplane but it is to be understood that it is applicable to other types of aircraft and also to purely land vehicles.

One of the objects of the invention is to provide novel means for utilizing the weight of the vehicle, when acted upon by the force of gravity, to produce the necessary power for cranking the vehicle propelling engine.

Another object of the invention is to provide, in combination with starting means of the foregoing character, means for combining in a novel structure the ordinary functions of both an engine starting mechanism and a shock absorbing or retarding mechanism.

Another object of the invention is to provide a shock absorbing apparatus for automotive vehicles so constructed and controlled as to be capable of functioning normally as a shock absorber and also occasionally as means for setting the engine starting mechanism in operation.

Another object of the invention is to provide an engine starting mechanism having a driving member drivably connected to a portion of the body of the associated vehicle whereby a downward movement of the vehicle from its normal position into a position closer to the ground, will serve, through suitable motion translating connections, as the actuating movement for cranking the engine.

A further object of the invention is to provide a shock absorber of the character above described having novel control means therefor permitting the release of all or a portion of the normal pressure existing therein when it is desired to crank the engine.

A further object of the invention is to provide, in conjunction with the foregoing apparatus, novel means for restoring normal pressure in the shock absorber to permit the device to perform its normal function.

A further object of the invention is to provide novel speed transmitting connections between the body of the vehicle and the engine member to be cranked to permit sufficient rotative movement of said member in response to a relatively slight downward movement of the vehicle.

Other objects and advantages to be derived from the use of the invention disclosed will become evident on an inspection of the following specification, with reference to the accompanying drawing illustrating one embodiment thereof. It is to be expressly understood, however, that said drawing is for the purpose of illustration only and is not to be construed as a definition of the limits of the invention, reference being had to the appended claims for this purpose.

In the drawing:

Fig. 1 is a side elevation view of an airplane equipped with apparatus embodying the invention;

Fig. 2 is an elevation view taken at right angles to the view point of Fig. 1; and Fig. 3 is an elevation view of another embodiment of one phase of the invention.

Referring to the drawing, the reference character 1 designates the fuselage of an airplane having a conventional type of motor, as indicated at 2, adapted to drive the propelling member 3, the plane being shown provided with landing gearing including a diagonally disposed strut 5 connecting the fuselage with one of the axles 6, the opposite axle being omitted from the drawing for the sake of simplicity. A pair of additional supporting members 8 and 9 are shown connecting another portion of the fuselage with the hub 10 in which the axle 6 is journaled and on which the wheel 11 is mounted.

Suitable starting mechanism for turning over the crankshaft of the engine 2 at sufficient speed to permit starting thereof under its own power comprises a main driving unit mounted in a housing 13 suitably secured to a flange 14 formed on the crankcase of the engine 2, and containing the usual member adapted to move longitudinally into engagement with a corresponding member of the engine crankshaft or an extension thereof and then rotate said member by the transmission of rotative force exerted thereupon through the torque transmitting connections leading from the gear 27 and operating in a manner well known in the art, and forming no part of the present invention except insofar as it co-operates with and is operated by the novel means for actuating the gear 27 now to be described.

Novel means for imparting rotation to the gear 27 and exerting torque thereon to be transmitted to the driving member, comprises, as shown, a triangular shaped sector element 25 having teeth 26 adapted to mesh with the teeth on gear 27, the latter being drivably associated with the crankshaft of engine 2, as above explained.

The sector 25 is pivotally secured as shown at 28 to a member of the fuselage of the plane, the member 28 also serving for the attachment of the extension member or link 29 to the outer end of which is secured a link 30 extending downwardly for pivotal attachment as indicated at 32 to a suitable hub or boss 33 secured to the axle 6. From this construction it is evident that upon downward movement of the fuselage 1 relatively to the axle 6, the sector 25 and link 29 will be rotated about the pin 34 as a center and due to the engagement of teeth 26 with gear 27, the latter will be rotated through a much greater angle than that through which the sector 25 passes, the ratio of the two movements being a function of the length of the lever arm from the pivot point 34 to the gear 27.

Novel means for effecting such a downward movement of the fuselage 1 with respect to the axle 6 when it is desired to crank the engine through the driving connection above described, comprises, in the illustrated embodiment, a shock absorbing device 40 having novel control means permitting the release of all or a portion of the pressure normally obtaining therein, together with means for restoring such pressure when the engine has been started.

As shown the shock absorber 40 is provided with suitable ears 41 and 42 facilitating attachment to the supporting members 8 and 9, and comprises a piston or plunger member 43 having a wrist pin 44 on which is pivotally mounted a connecting rod 45 having a suitable bearing 46 on the axle 6, the upward movement of the piston 43 being normally cushioned or retarded by virtue of the provision of the chamber 47 normally containing compressed fluid, such as air, which may be maintained at the desired pressure through a suitable pressure regulating device, not shown, associated with the compressed fluid reservoir 50. Interposed between the supply lines 51 and 52 connecting the tank 50 with the shock absorber 40 is a suitably constructed valve 53 having a port 54 communicating with the atmosphere and a suitable valve operable manually by lever 55 whereby the lines 52 may be connected alternately, and when desired, with either the supply line 51 or the exhaust 54. Suitable means, (not shown) may be provided for maintaining the desired pressure in tank 50.

During normal flight of the plane the pilot may, if he chooses, leave the valve 53 in a position to establish communication between line 52 and the atmosphere, thereby permitting the shock absorber to occupy the position in which it offers the least resistance to the air. In any event, before landing, the pilot will place the valve in a position to cut off exhaust and supply the chamber 47 with compressed fluid from the reservoir 50 so that the shock absorbing mechanism will be in condition to function as intended in absorbing the force of impact upon landing.

When it is desired to restart the engine, the operator shifts lever 55 so as to place the line 52 in communication with the atmosphere. This action results in a sudden release of pressure in chamber 47, which pressure has been holding members 8 and 9 and the fuselage in the extreme upward position with respect to the axle 6. The release of this pressure permits a sudden descent of the fuselage due to its own weight. This sudden dropping of the body of the craft acts, as above explained to swing the sector 25 downwardly, thereby rotating gear 27, and through the speed multiplying gearing shown in Fig. 3, exerts torque upon the crank shaft to an extent sufficient to assure successful cranking of the engine 2.

There is thus provided novel engine starting means employing as the motive power the weight of the engine and vehicle, and eliminating the necessity of the use of an electric prime mover or other usual energy supplying device. There is further provided a novel combination of engine starting and shock absorbing mechanism possessing obvious features of advantage and extending the usefulness of these elements to the machine.

It is to be understood that the invention may be embodied in various constructions differing from that illustrated herein, but nevertheless employing the novel principles and features herein disclosed. Thus, for example, other means may be employed for relieving the pressure which normally supports the fuselage in its upper position and instead of using a single displaceable fluid as a shock absorbing medium the shock absorber may operate with a combination of substances such as both air and liquid, as indicated in Fig. 3, and other resilient or compressible members may be employed. As shown, in Fig. 3 there is a further variation in the shock absorbing structure in that the upwardly moving element 43a is arranged to envelop the relatively stationary element 57 rather than slide within said element in the manner of operation of the piston 43 shown in Fig. 1. Moreover, in the form shown in Fig. 3, the turning of valve 53a to relieve the air pressure in the shock absorber does not affect the maintenance of a certain amount of pressure in the chamber 47a, due to the provision of the non-escaping liquid. Hence in this embodiment of the invention there is only a partial, rather than a complete loss of pressure as a condition precedent to the downward movement of the vehicle which produces the cranking action.

Likewise other changes which will now suggest themselves to those skilled in the art may be made in the form, details of construction and arrangement of the parts without departing from the scope of the invention as disclosed herein, and reference is therefore to be had to the appended claims for a definition of such scope.

What is claimed is:

1. In an engine starter for use in cranking the engine of an airplane or other automotive vehicle, in combination with a driving member adapted to engage and rotate a member of the engine to be started, a vehicle supporting member, means for moving said vehicle supporting member vertically to raise the vehicle solely by the pressure thus exerted upon said supporting member, and means operable by the release of said pressure and the resultant descent of the vehicle to actuate said driving member to start the engine.

2. In a combined engine starting and shock absorbing system for automotive vehicles, in combination with a driving member adapted to crank a member of the engine to be started, means for connecting said driving member for driving movement in response to bodily descent of the associated vehicle, a shock absorbing device for controlling such bodily descent, fluid means in said device normally under pressure and operative to retard and cushion said descent, and means for releasing the pressure in said fluid means to permit a descent of the vehicle with sufficient rapidity to crank the engine through the intermediary of said driving member.

3. In a combined engine starting and shock absorbing system for automotive vehicles, in combination with a driving member adapted to crank a member of the engine to be started, means for connecting said driving member for driving movement in response to bodily descent of the associated vehicle, a shock absorbing device for controlling such bodily descent, fluid means in said device normally under pressure and operative to retard and cushion said descent, means for releasing the pressure in said fluid means to permit a descent of the vehicle with sufficient rapidity to crank the engine through the intermediary of said driving member, and means operable by said engine to re-energize said retarding and cushioning means to again render said shock absorbing device effective to perform its normal function.

4. In an engine starter for use in cranking the engine of an airplane or other automotive vehicle, in combination with a driving member adapted to engage and rotate a member of the engine to be started, a supporting device mounted between the body of the vehicle and one of its axles and normally effective to hold the body of said vehicle at a predetermined distance above said axle in opposition to the force of gravity, means for rendering said supporting device ineffective, thereby causing a relatively rapid descent of said body toward said axle, and means for translating the downward motion of said body into a cranking motion of said driving member.

5. In an engine starter for use in cranking the engine of an airplane or other automotive vehicle, in combination with a driving member adapted to engage and rotate a member of the engine to be started, a supporting device mounted between the body of the vehicle and one of its axles, and normally effective to hold the body of said vehicle at a predetermined distance above said axle in opposition to the force of gravity, means for rendering said supporting device ineffective, thereby causing a relatively rapid descent of said body toward said axle, means for translating the downward motion of said body into a cranking motion of said driving member, said means comprising a link mechanism connecting said driving member to said axle, and means for pivotally securing said link mechanism to said body at a point intermediate said axle and driving member.

6. In combination with a shock absorber adapted to be mounted on the landing gear of an airplane and comprising fluid pressure means normally acting to maintain the body of the plane at a predetermined height above said landing gear, means for rendering said fluid pressure means temporarily ineffective, said means being manually operable when it is desired to crank the engine of the plane, and means operating in response to the manual operation of said last named means to transmit the force of the resulting downward movement of the vehicle to a member of the engine to be started whereby said engine member is rotated to crank the engine.

7. In combination with a shock absorber adapted to be mounted on the landing gear of an airplane, and comprising fluid pressure means normally acting to maintain the body of the plane at a predetermined height above said landing gear, means for relieving a portion only of the pressure in said device, said means being manually operable when it is desired to crank the engine of the plane, and means operating in response to the manual operation of said pressure relieving means to transmit the force of the resulting downward movement of the vehicle to a member of the engine to be started whereby said engine member is rotated to crank the engine.

8. In an engine propelled vehicle in combination with a member of the engine to be started, a driven member adapted for engagement with the engine member, means normally maintaining the vehicle in a predetermined position relative to a datum plane, said means constituting a part of the permanent supporting means for the vehicle body, means for lowering said body to a position nearer said datum plane, and means operable by the lowering movement of the body for actuating said driven member.

9. In combination with an engine and a supporting body therefor; means for maintaining a regulable pressure on said supporting body and means operatively connected to the body and engine and actuated by a decrease in the sustaining pressure for cranking said engine.

10. In combination with an automotive engine and its associated vehicle, releasable fluid means for supporting said vehicle, and means operable upon the release of said supporting means to exert a cranking torque on a rotatable member of said engine.

11. In an engine starter for use in cranking the engine of an airplane or other automotive vehicle, in combination with a driving member adapted to engage and rotate a member of the engine to be started, a fluid containing device mounted between the body of the vehicle and one of its axles to hold the body of said vehicle at a predetermined distance above said axle in opposition to the force of gravity, means for rendering said fluid containing device ineffective, thereby causing a relatively rapid descent of said body toward said axle, and means for translating the downward motion of said body into a cranking motion of said driving member.

12. In an engine starter for use in cranking the engine of an airplane or other automotive vehicle, in combination with a driving member adapted to engage and rotate a member of the engine to be started, compressible means operative to hold the body of the vehicle at a predetermined distance above the ground engaging gear in opposition to the force of gravity, said force of gravity being operative upon removal of energy from said compressible means to produce downward motion of said compressible means and corresponding downward motion of the vehicle, and means for translating the resultant downward motion of the vehicle into a cranking motion of the driving member.

EMIL R. DRAVER.